Patented Sept. 9, 1952

2,610,166

UNITED STATES PATENT OFFICE 2,610,166

TREATMENT OF EQUIPMENT

Harvey L. Parry, Concord, and Donald C. Waldman, Lafayette, Calif., assignors to Shell Development Company, Emeryville, Calif., a corporation of Delaware No Drawing. Application April 2, 1951, Serial No. 218,906

14 Claims. (Cl. 260—33.4)

This invention relates to the treatment of equipment employed for processing materials comprising aliphatic unsaturated aldehydes at elevated temperatures. The invention relates more particularly to the removal and recovery of polymeric deposits from surfaces which have come into contact with alpha,beta-unsaturated aliphatic aldehydes at elevated temperatures.

In the processing of materials comprising unsaturated aliphatic aldehydes, difficulties are often encountered which are directly attributable to the deposition of polymers within the equipment employed. Properties of a specific polymeric deposit governing the ability to remove it under conditions within the realm of practicability vary to some extent in accordance with the particular unsaturated aldehyde from which it is derived. In processing materials comprising alpha,beta-unsaturated aliphatic aldehydes such as, for example, acrolein and methacrolein, surfaces of equipment which come into contact with the aldehyde at temperatures above room temperature will have deposited thereon a film-like, polymeric material. The rate of deposition of the polymeric scale, and the difficulties heretofore encountered in its removal, often militated against efficient large scale operation of a process. These difficulties are generally aggravated by the presence of other components in the aldehydic materials treated. Such commonly occurring material as water will often materially increase the rate of polymer deposition. Polymer itself, when once formed, appears to increase the rate of further scale formation. The formation of the polymeric scale is generally not obviated to any sufficient degree by the presence of an agent, such as, a polymerization inhibitor in the material undergoing treatment. Disadvantages heretofore directly attributable to the formation of the polymer deposits include not only inability to maintain optimum operating conditions as a result of clogging of conduits, fractionators, condensers, pumps, heaters and other parts of equipment employed, and relatively high cost of polymeric scale removal, but also the conversion of valuable charge to material which could not be recovered economically as a product of practical value.

It is an object of the present invention to provide an improved method enabling the more efficient removal of polymeric deposits from surfaces of equipment coming into contact with alpha,beta-unsaturated aliphatic aldehydes at elevated temperatures.

A further object of the invention is the provision of an improved method enabling the more efficient removal of polymeric deposits from the walls of equipment employed in the processing of alpha,beta-unsaturated aliphatic aldehydes having from three to four carbon atoms to the molecule.

A further object of the invention is the provision of an improved method enabling the more efficient recovery, in the form of valuable compositions, of polymeric deposits formed upon surfaces of equipment employed for the processing of alpha,beta-unsaturated aliphatic aldehydes having from three to four carbon atoms to the molecule at elevated temperatures. Other objects and advantages of the invention will become apparent from the following detailed description thereof.

In accordance with the invention, polymeric deposits formed upon surfaces of equipment coming into contact with an alpha,beta-unsaturated aliphatic aldehyde at elevated temperatures are recovered therefrom by contact with a normally liquid hydroxy compound selected from the class consisting of glycols and halohydrins at a temperature above about 50° C.

The invention is applied to the removal and recovery of polymeric deposits from any type of equipment employed in the processing of materials comprising alpha,beta-unsaturated aliphatic aldehydes. It is applied with particular advantage to the recovery of the particularly troublesome, hard, scaly, polymeric deposits formed upon contact of the surfaces of such equipment with materials comprising an alpha,beta-unsaturated aliphatic aldehyde having from three to four carbon atoms to the molecule, such as acrolein, methacrolein and crotonaldehyde at temperatures above about 20° C. It is of particular value in the removal of the polymeric deposits formed by contact of the surfaces of equipment with materials comprising the acrolein- and/or methacrolein-containing reaction mixtures obtained by the catalytic oxidation of corresponding olefins. The polymeric deposits formed upon surfaces of equipment by these unsaturated aldehydes exhibit to an unusual degree a lack of appreciable solubility in readily available solvents. The polymeric deposits have been found to be either completely insoluble or of such limited solubility in many solvents tried at ordinary and elevated temperatures that attempts to remove these deposits from equipment by the use of solvents has heretofore been generally considered outside the realm of practicability in commercial scale operation. The unusual degree to which these polymeric deposits exhibit insolubility in many solvents is evidenced by the following example.

EXAMPLE I

Crude acrolein having essentially the following composition:

| | Per cent |
|---|---|
| Acrolein | 80 |
| Acetaldehyde | 11 |
| Propionaldehyde | 3 |
| Acetone | 1 |
| Water | 5 | obtained by the catalytic oxidation of propylene was subject to distillation in a distillation zone including a still and fractionating column. During the course of the distillation a white amorphous polymeric scale was formed upon surfaces within the distillation equipment employed. Polymeric deposit was removed by scraping from the walls of equipment. Analysis of the deposit indicated approximately 54.5% carbon and 8.2% hydrogen. In a series of separate and individual operations, portions of the polymeric deposit together with a measured amount of solvent were placed in a still and refluxed for a period of one hour to determine the extent of solubility of the polymeric material in the solvent employed. The solvent employed, and results of observation with respect to solubility of the polymer in each solvent at the end of the refluxing period are indicated for each operation in the following table:

Table A

| | Room Temperature | One hour Reflux |
|---|---|---|
| water | insol | insol. |
| ethyl alcohol | insol | insol. |
| n-butyl alcohol | insol | insol. |
| glycerol | insol | insol. |
| carbitol | insol | insol. |
| diisobutylcarbinol | insol | insol. |
| ethyl Cellosolve | very slightly sol. | slightly sol. |
| benzene | insol | insol. |
| xylene | insol | insol. |
| dodecane | insol | insol. |
| isobutyraldehyde | insol | insol. |
| acrolein | insol | insol. |
| acetone | insol | insol. |
| methylisobutylketone | insol | insol. |
| Dowtherm | insol | insol. |
| glacial acetic acid | insol | insol. |

The polymeric deposit proved to be insoluble in ammonia.

Insolubility to such an extreme degree is similarly exhibited by the polymeric deposits formed upon distillation of a crude methacrolein obtained by the catalytic oxidation of isobutylene.

It has now been found that quite surprisingly the polymeric deposits formed by the alpha,beta-unsaturated aliphatic aldehydes are found to be soluble to at least a substantial degree in the members of a specific and well defined class of solvents at elevated temperatures. These solvents for the polymeric deposits formed by the alpha,-beta-unsaturated aliphatic aldehydes are the normally liquid hydroxy compounds selected from the class consisting of the glycols and halohydrins. Examples of such suitable solvents are: ethylene glycol, the prapandiols, the butandiols, the pentandiols, the hexandiols, the heptandiols, the octandiols, the alkylene halohydrins corresponding to the glycols such as, for example, ethylene chlorohydrin, glycerol alpha monochlorohydrin, glycerol dichlorohydrin, alpha propylene chlorohydrin, beta propylene chlorohydrin, trimethylene chlorohydrin, the butylene chlorohydrins, the amylene chlorohydrins, their homologues, etc. Of these compounds the glycols and chlorohydrins having a boiling temperature ranging, for example, about 150° C. to about 225° C. are preferred. Examples of such preferred solvents are: ethylene glycol, trimethylene glycol, alpha butylene glycol, beta butylene glycol, tetramethylene glycol, pentamethylene glycol, hexamethylene glycol, ethylene chlorohydrin, glycerol alpha monochlorohydrin, glycerol dichlorohydrin, alpha propylene chlorohydrin, trimethylene chlorohydrin, etc. Particularly preferred are the normally liquid glycols and chlorohydrins having at least two but no more than three carbon atoms to the molecule. Solubility of the polymeric deposits formed by the alpha,-beta-unsaturated aliphatic aldehydes in the class of normally liquid hydroxy compounds above defined is illustrated by the following example.

EXAMPLE II

In two separate and independent operations, separate portions of the same polymeric deposit formed in the distillation of crude acrolein employed in the tests of Example I were refluxed for a period of one hour in ethylene glycol. Complete solubility of the polymeric material in the ethylene glycol was obtained.

Solution of the polymeric deposits in the above-defined hydroxy compounds need not be carried out under refluxing conditions and may be obtained by simple contact of the polymeric material with the solvent at an elevated temperature. The particular temperature preferred will depend to some extent upon the specific solvent to be used and source of the polymeric deposit to be dissolved therein. In general, temperatures above about 50° C. are satisfactory. The use of temperatures above 100° C., and still more preferable temperatures approximating the boiling temperature of the hydroxy compound employed as solvent are preferred. The solvents of the above-described class may be employed in admixture with one another. A particularly effective solvent for the polymeric deposit formed by acrolein- and/or methacrolein-containing materials is glycol in admixture with glycerol dichlorohydrin. In the removal of polymeric deposits from equipment in accordance with the process of the invention, the above-defined normally liquid hydroxy compounds need not necessarily be employed in a state of substantial purity. The presence therein of components comprising, for example, solvents which by themselves fail to dissolve the polymeric deposit appear to exert no substantial degree of interference with efficient removal of the deposit by solution in the mixture. This willful addition of such relatively inert components, particularly those solvents which are cheap and readily available, to the above-defined normally liquid hydroxy compounds may be resorted to function as diluents in the resulting admixtures.

The following example is a further illustration of the solubility of the polymeric deposits derived from alpha,beta-unsaturated aliphatic aldehydes in the above-defined normally liquid hydroxy compounds.

EXAMPLE III

Hard, white, amorphous, polymeric deposits formed upon the distillation of a crude methacrolein were each separately immersed in a plurality of solvents in a series of separate and independent operations. The temperature of contact with the solvent, and results of observations made with respect to the degree of solution in each of the solvents is indicated in the following table for each of the separate operations.

The polymeric deposits were washed with acetone and dried before use in the following tests.

Table B

| Source of Polymeric Deposit | Solvent Used | Solubility at 20° C. | Solubility at 80° C. | Remarks |
|---|---|---|---|---|
| Methacrolein | glycerol dichlorohydrin | softens then dissolves slowly with emaceration. | readily soluble | true solution; adding water precipitates polymer. |
| Acrolein | do | softens but no substantial solution. | dissolves | polymer does not precipitate out upon cooling. |
| Do | 90% phenol + 10% glycol | | very soluble | |
| Do | phenol | insoluble | slightly soluble | |
| Do | 50% glycerol diclorohydrin + 50% glycol. | softens but does not dissolve. | complete solubility. | |
| Do | 85% glycerol dichlorohydrin + 15% glycol. | | soluble | |
| Do | 25% glycerol dichlorohydrin + 75% Dowtherm. | softens but does not dissolve. | do | |
| Do | Dowtherm | insoluble | insoluble | |

It is seen from the foregoing data that relatively small amounts of the normally liquid hydroxy compounds of the class consisting of glycols and chlorohydrins when added to a liquid in which the polymeric deposit is normally completely insoluble or only slightly soluble will result in a mixture capable of dissolving the polymeric material. The invention is of particular value in that it enables not only the thorough removal in a practical manner of polymeric deposits which were heretofore removable from equipment only with great difficulty, but in that it enables the removal to proceed with rapidity as evidenced by the following example.

EXAMPLE IV

Crude acrolein obtained by the catalytic oxidation of propylene and having essentially the following compositions:

| | Per cent |
|---|---|
| Acrolein | 80 |
| Acetaldehyde | 11 |
| Propionaldehyde | 3 |
| Acetone | 1 |
| Water | 5 | was distilled in a still comprising a fractionating column which was packed with Nichrome metal packing. After a prolonged period of operation, the presence of the characteristic hard, amorphous, polymeric, scaly deposit became evident. When the polymer deposition had progressed to a degree interfering with efficient operation of the column, the distillation operation was discontinued. Substantially anhydrous glycol was introduced into the still. A portion of the glycol was distilled overhead from the column to assure the removal of any residual water from the column. The distillation was then continued under conditions of total reflux for a period of five minutes. Solution of substantially all of the polymeric deposit in the glycol was obtained. The solution of polymeric deposit in glycol was drawn from the still as a final product.

A particular advantage of the invention resides in its ability to enable the recovery in the form of a valuable and useful product the deposits formed when processing alpha,beta-unsaturated aliphatic aldehydes. The ability to so recover the polymeric deposit as a desirable product obviates substantially completely the loss of relatively valuable charge material which loss contributes to increase in cost of operation. The solutions consisting essentially of the polymeric deposits obtained from alpha,beta-unsaturated aliphatic aldehydes dissolved in a normally liquid hydroxy compound of the above-defined class are valuable as such. The ability to dissolve the polymeric material efficiently enables the conversion of the polymeric material to a form readily adapted for its use as a starting material, or an intermediate material, in the production of highly valuable derivatives therefrom. Availability of the polymeric material in solution enables its use as a starting material in processes wherein it is caused to react with ammonia, sulfur, halogens, and the like. It enables the use of the polymeric deposits as modifying agents for other polymeric materials of natural and synthetic origin such as, for example, natural and synthetic rubbers, diene polymers and copolymers, etc. A further valuable application of the compositions consisting of solutions of the polymeric deposits in the glycols and chlorohydrins is their use as impregnating agents for fibers and bibulous materials generally wherein they function as pretreating agents, stiffening agents, water-proofing agents, and the like. The hard amorphous nature of the polymeric deposit, coupled with its lack of solubility in many solvents, renders the solutions thereof valuable in the formation of resinous, smooth, water-proof surfaces.

The invention is not limited in its application to the removal of polymeric deposit from any specific type of equipment, or parts of apparatus, employed in the processing of alpha,beta-unsaturated aliphatic aldehydes. It is employed with particular advantage in the removal of the deposits formed by these unsaturated aldehydes upon the interior walls of reaction zones comprising those of enlarged cross-sectional areas, such as tanks and chambers; or those of restricted cross-sectional areas, such as tubular reactors, coils and the like; or of distillation zones comprising stills, bubble-cap columns, packed columns, fractionating, scrubbing and extraction columns in general; or of condensers, conduits, pumps, etc.

Removal of the deposited polymeric material from the equipment may be carried out in any suitable manner enabling the contacting of the solvents with the polymeric deposit under conditions resulting in their solution. Since water will generally result in throwing polymer out of solution, the above-defined class of hydroxy compounds employed as solvents in accordance with the invention are preferably employed in the anhydrous state. When substantial amounts of water are present within the equipment from which polymeric deposits are to be removed it is preferred to remove at least a substantial amount of the water prior to effecting the solution and removal of polymeric material from the equipment. Such initial drying of the equipment is obtained by the use of a solvent capable of removing water, for example, by washing the equipment therewith, or by distilling it in the equipment with the removal of water as bottom or overhead product. One method of operation comprises the use of a portion of the solvent for the polymeric deposit as the drying agent. Thus, in the removal of a polymeric deposit from equipment such as, for example, a fractionating column, in accordance with the invention a normally liquid hydroxy compound of the above-defined class capable of dissolving the deposit, such as glycol or glycerol dichlorohydrin, is introduced into the column and a portion thereof distilled overhead to carry with it at least a substantial part of the water in the column. When water has thus been removed from the column, distillation is continued under conditions of total reflux resulting in solution of the polymeric deposit in the solvent and accomulation of the resulting solution as bottoms in the column. Bottoms comprising the solvent and polymeric deposit are withdrawn from the column. After withdrawal of the polymer-containing solution from the column, residual solvent may be removed from the column by conventional means such as, for example, distillation of a portion of the charge to be distilled through the column prior to continuing the cycle of operation.

The polymeric material is readily separated from solution in the hydroxy compounds by conventional means comprising such steps as, for example, distillation, precipitation by the addition of water, etc. After separation of the polymer from the solutions of the solvent, consisting essentially of the hydroxy compound now free of any substantial amount of polymeric deposit, may be used again in the removal of polymeric deposit from equipment wherein it is formed. Removal of polymeric deposits from equipment within the scope of the invention may comprise the continuous withdrawal of polymer-containing solution from the equipment in combination with a continuous recovery of polymer from the solution thus removed from the equipment, and the recycling of the recovered polymer-free solvent to the column.

The invention claimed is:

1. The method of recovering polymeric deposits formed in equipment during the processing of alpha,beta-unsaturated aliphatic aldehydes at elevated temperatures therein, which comprises contacting said polymeric deposits within said equipment with a normally liquid solvent consisting essentially of at least one hydroxy compound of the class consisting of the glycols and halohydrins at a temperature of from about 50° C. to that of the boiling temperature of said solvent, thereby dissolving at least a substantial part of said polymeric deposit in said solvent, and withdrawing resulting solution comprising said solvent and said polymeric deposit from said equipment.

2. The method of recovering polymeric deposits formed in equipment during the processing of alpha,beta-unsaturated aliphatic aldehydes at elevated temperatures therein in accordance with claim 1 wherein said hydroxy compound is a glycol having from three to four carbon atoms to the molecule.

3. The method of recovering polymeric deposits formed in equipment during the processing of alpha,beta-unsaturated aliphatic aldehydes at elevated temperatures therein in accordance with claim 1 wherein said hydroxy compound is a chlorohydrin having from three to four carbon atoms to the molecule.

4. The method of recovering polymeric deposits formed in equipment during the processing of alpha,beta-unsaturated aliphatic aldehydes at elevated temperatures therein in accordance with claim 1 wherein said hydroxy compound is ethylene glycol.

5. The method of recovering polymeric deposits formed in equipment employed for the processing of materials comprising an alpha,beta-unsaturated aliphatic aldehyde having from three to four carbon atoms to the molecule at elevated temperatures therein which comprises contacting said polymeric deposit within said equipment with a normally liquid solvent consisting essentially of at least one hydroxy compound selected from the group consisting of glycols and halohydrins at a temperature ranging from about 50° C. to that of the boiling temperature of said solvent, thereby dissolving at least a substantial part of said polymeric deposit in said solvent, and withdrawing the resulting solution comprising said solvent and said polymeric deposit from said equipment.

6. The method of recovering polymeric deposits formed in equipment employed in the processing of materials comprising an alpha,beta-unsaturated aliphatic aldehyde having from three to four carbon atoms to the molecule at an elevated temperature therein in accordance with claim 5 wherein said hydroxy compound is a glycol having a boiling temperature of from about 150° C. to about 225° C.

7. The method of recovering polymeric deposits formed in equipment employed in the processing of materials comprising an alpha,beta-unsaturated aliphatic aldehyde having from three to four carbon atoms to the molecule at an elevated temperature therein in accordance with claim 5 wherein said hydroxy compound is a chlorohydrin having a boiling temperature of from about 150° C. to about 225° C.

8. The method for recovering polymeric deposit formed in equipment employed for the processing of materials comprising acrolein at an elevated temperature therein, which comprises contacting said polymeric deposit within said equipment with a normally liquid solvent consisting essentially of ethylene glycol at a temperature ranging from about 50° C. to that of the boiling temperature of ethylene glycol, thereby dissolving at least a substantial part of said polymeric deposit in said solvent, and withdrawing resulting solution comprising ethylene glycol and said polymeric material from said equipment.

9. The method for the recovery of polymeric deposit formed in equipment employed for the processing of materials comprising methacrolein at an elevated temperature which comprises contacting said polymeric deposit within said equipment with a normally liquid solvent consisting essentially of glycerol dichlorohydrin at a temperature ranging from about 50° C. to about that of the boiling temperature of glycerol dichlorohydrin, thereby dissolving at least a substantial part of said polymeric deposit in said solvent, and withdrawing resulting solution comprising glycerol dichlorohydrin and said polymeric deposit from said equipment.

10. The novel compositions obtained by the solution of polymeric deposits, formed at elevated temperatures in equipment during the processing of alpha,beta-unsaturated aliphatic aldehydes having from three to four carbon atoms to the molecule therein, in a normally liquid solvent consisting essentially of at least one hydroxy compound selected from the class consisting of glycols and halohydrins at a temperature of from about 50° C. to that of the boiling temperature of said solvent.

11. The novel compositions in accordance with claim 10 wherein said hydroxy compound is a glycol having from two to three carbon atoms to the molecule and has a boiling temperature in the range of from about 150° C. to about 225° C.

12. The novel compositions in accordance with claim 10 wherein said hydroxy compound is a chlorohydrin having from two to three carbon atoms to the molecule and has a boiling temperature of from about 150° C. to about 225° C.

13. The novel compositions obtained by the solution of polymeric deposits, formed at elevated temperatures in equipment during the processing of acrolein therein, in ethylene glycol at a temperature in the range of from about 50° C. to the boiling temperature of ethylene glycol.

14. The novel compositions obtained by the solution of polymeric deposits, formed at elevated temperatures in equipment during the processing of methacrolein therein, in glycerol dichlorohydrin at a temperature in the range of from about 50° C. to the boiling temperature of glycerol dichlorohydrin.

HARVEY L. PARRY.
DONALD C. WALDMAN.

REFERENCES CITED

The following references are of record in the file of this patent:

UNITED STATES PATENTS

| Number | Name | Date |
|---|---|---|
| 2,071,419 | Moss | Feb. 23, 1937 |